UNITED STATES PATENT OFFICE.

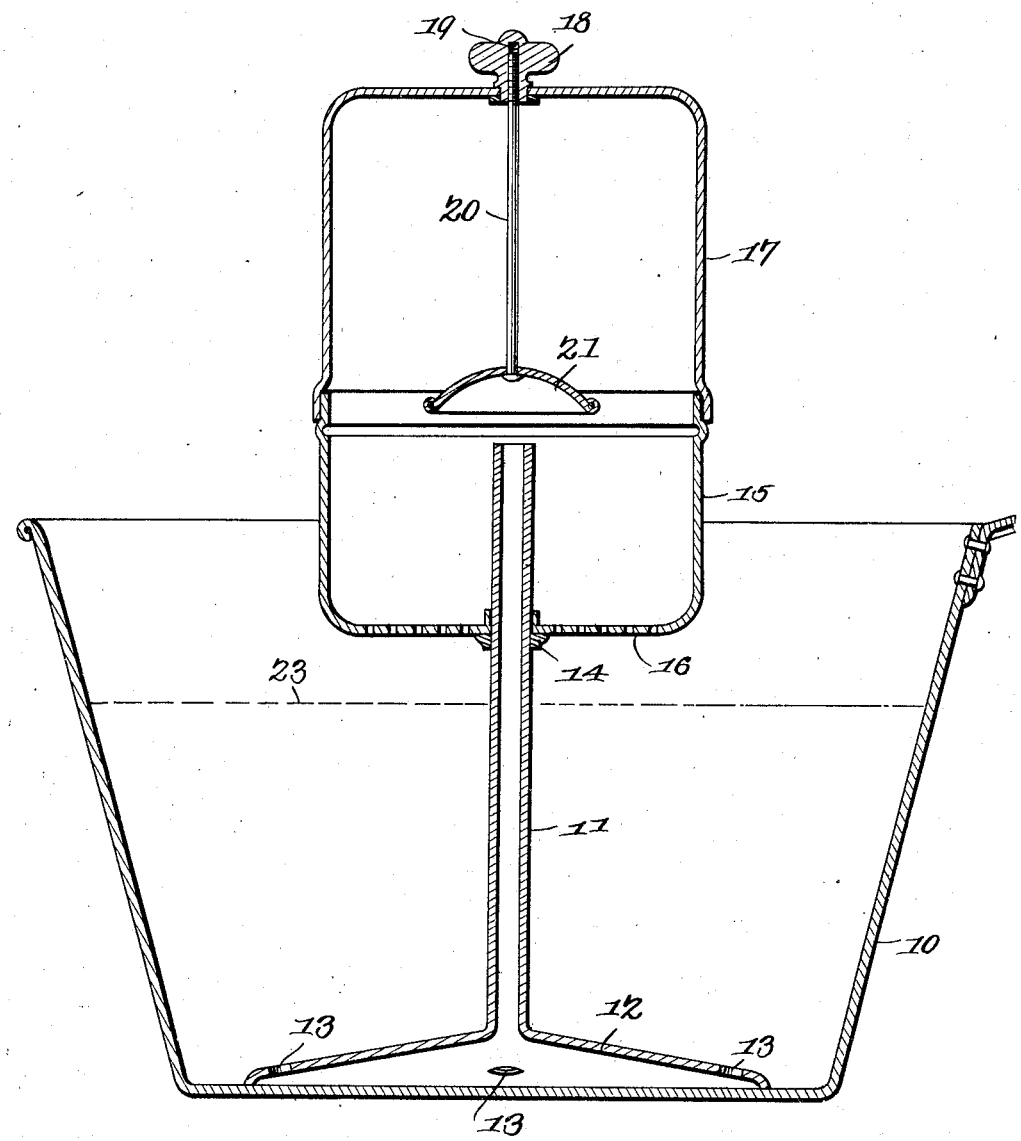

JAMES FRANK DOWLING, OF BUFFALO, NEW YORK.

EXTRACTOR.

No. 832,045.　　　　　Specification of Letters Patent.　　　　　Patented Oct. 2, 1906.

Application filed October 30, 1905. Serial No. 285,116.

*To all whom it may concern:*

Be it known that I, JAMES FRANK DOWLING, a citizen of the United States, residing at Buffalo, in the county of Erie and State of New York, have invented a new and useful Extractor, of which the following is a specification.

This invention relates to devices employed for extracting the essential portions from coffee, tea, and other substances or products, and has for its object to improve the construction and increase the efficiency of devices of this character.

With these and other objects in view, which will appear as the nature of the invention is better understood, the invention consists in certain novel features of construction, as hereinafter fully described and claimed.

In the accompanying drawing, forming a part of this specification, and in which corresponding parts are denoted by like designating characters, is illustrated the preferred form of embodiment of the invention capable of carrying the same into practical operation, it being understood that various changes in the form, proportions, and minor details of construction may be resorted to without departing from the principle or sacrificing any of the advantages of this invention within the scope of the appended claims.

The figure is a longitudinal sectional elevation of the improved device applied.

The improved device is employed within a suitable vessel, preferably open, as shown, and may be of any size or of any required material and for the purpose of illustration is shown arranged in an ordinary saucepan-like vessel 10.

The improved device consists of a tubular member 11, having a laterally-extended relatively shallow chamber 12 at the lower end, with its open lower side resting upon the bottom of the vessel 10, the chamber being conical in form and preferably integral with the tubular member and provided with spaced apertures 13.

Disposed intermediate the tubular member 11 is a stop-shoulder 14, and supported upon this shoulder is a receptacle 15, having a perforated bottom 16 and with an upwardly-extending detachable closure or cap 17. The closure 17 is preferably of greater height than the receiver 15, so that a large area is produced above the receptacle. The closure or cap 17 is provided with a lifting-knob 18, the knob having a threaded cavity 19, into which a threaded rod 20 fits. Attached to the lower end of the rod is a deflector member 21, having a concaved lower face and spaced above the upper open end of the tubular member 11. The deflector is thus adjustable relative to the discharge end of the tubular member 11, as will be obvious.

The vessel 10 is supplied with the requisite amount of water or other liquid, as indicated at 23, into which the extracted product is to be precipitated, and the coffee, tea, or other product deposited in the receptacle 15 and the closure 17, carrying the deflector 21, placed in position thereon and heat applied to the vessel to cause the water when heated to rise in the tube 11 and be deflected by the member 21 upon the material in the receiver, through which it percolates and passes downward through the perforated bottom of the receptacle, carrying with it the volatile matter from the material therein. The steam and lighter vapors from the material rise into the chamber formed by the relatively high closures 17 and are therein condensed and fall back upon the mass and are carried with the water into the water in the vessel again. Thus the valuable particles of the material are extracted and without the loss of any portion of the mixing of the material with the decoction.

The device may be employed in operating upon any material or substance from which volatile matter can be extracted by the application of heat, steam, or hot liquids of any kind, but, as before stated, is more particularly adapted for extracting the essential particles from coffee, tea, and similar products. The receiver 15 and its cap 17 are exposed to the open air, thus producing a relatively large condensing-surface, exposed at all times to the atmosphere, so that all vapors are quickly condensed and with no tendency of the vapors or steam to escape. The action of the heat applied beneath the vessel 10 is to so quickly heat the comparatively small quantities of water in the contracted chamber 12 as to create a correspondingly rapid circulation upwardly through the tube 11 and drive the globules thus formed against the deflector 21 and reduce them to liquid again, which in falling upon the mass of material in the receiver effects the required extraction, as above stated. The extraction is thus effectually accomplished without "boiling," in the ordinary acceptance of that term.

Having thus described the invention, what is claimed is—

1. In a device of the class described, a tubular member having at one end a relatively shallow chamber, a receptacle having a perforated bottom and supported upon said tubular member intermediate the same, an upwardly-extended closure to said receptacle, a deflector suspended from said closure, and means for adjusting said deflector relative to said tube.

2. In a device of the class described, a tubular member having a relatively shallow chamber at one end provided with spaced apertures, a receiver supported upon said tubular member intermediate the same, an upwardly-extending closure to said receptacle, a deflector disposed above said tubular member, and means for adjusting said deflector relative to said tubular member.

3. In a device of the class described, a tubular member having a relatively shallow chamber at one end provided with spaced apertures, a receiver supported upon said tubular member intermediate the same, an upwardly-extending closure to said receptacle, a threaded cavity in said closure member and a threaded rod adjustably engaging said cavity and carrying a deflector member spaced from said tubular member.

In testimony that I claim the foregoing as my own I have hereto affixed my signature in the presence of two witnesses.

JAMES FRANK DOWLING.

Witnesses:
W. G. RICHARD,
THOMAS F. DOLAN.